Figure 1:
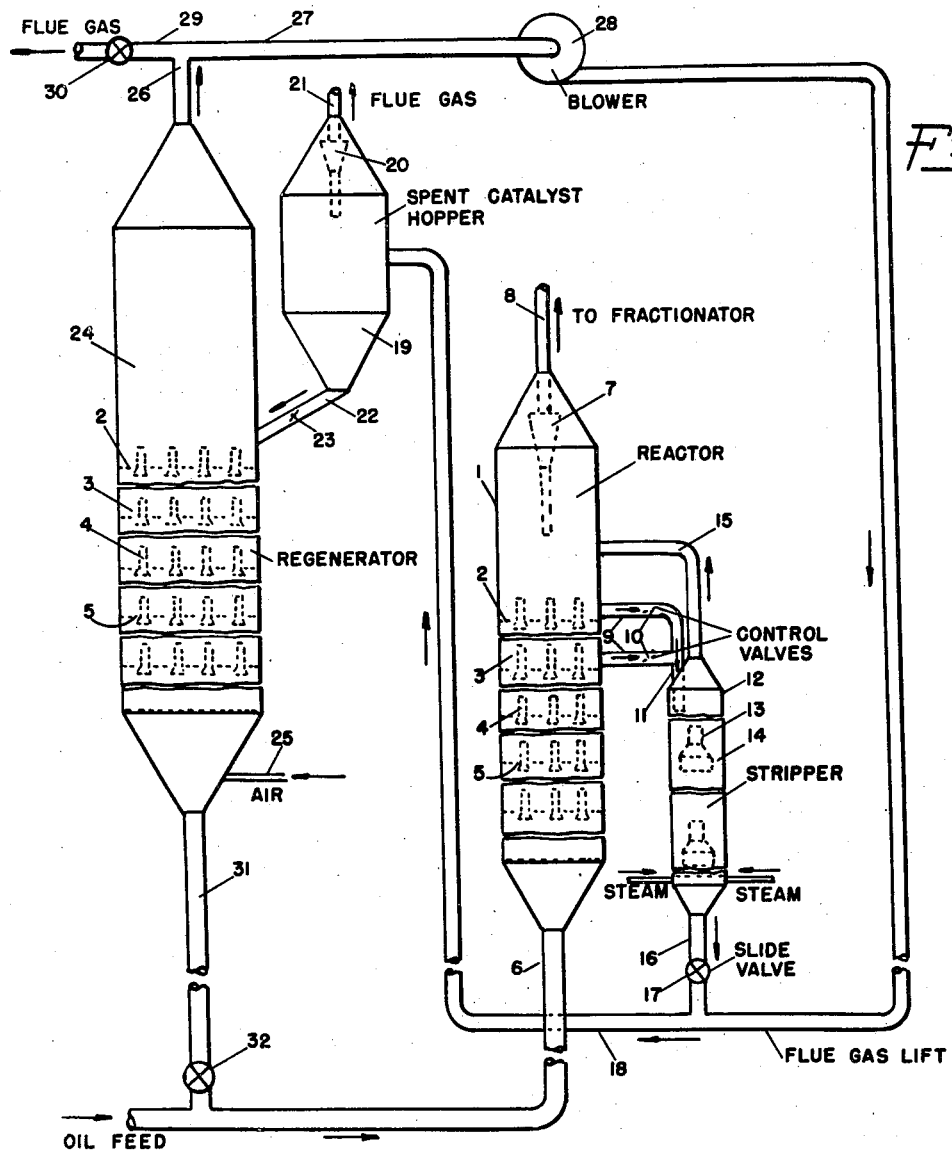

May 24, 1949.

R. E. HALL ET AL 2,471,064

STRIPPING OF SPENT CATALYST
IN HYDROCARBON CONVERSION

Filed April 30, 1947

INVENTORS
RALPH ELDEN HALL
MARION JAMES WILCOX
BY
Pennie, Edmonds, Morton & Barrows
ATTORNEYS Patented May 24, 1949

2,471,064

UNITED STATES PATENT OFFICE 2,471,064

STRIPPING OF SPENT CATALYST IN HYDROCARBON CONVERSION

Ralph E. Hall, East Chicago, Ind., and Marion J. Wilcox, Harvey, Ill., assignors to Sinclair Refining Company, New York, N. Y., a corporation of Maine Application April 30, 1947, Serial No. 745,037

2 Claims. (Cl. 196—52)

This invention relates to the pyrolytic conversion of hydrocarbons and, more particularly, to pyrolytic conversion processes involving the use of a finely divided catalyst.

The invention is especially applicable to conversion processes of the general type wherein a finely divided catalyst is brought into intimate contact with vaporized hydrocarbons to be converted in a reaction zone, spent catalyst is separated from the vapors, the separated catalyst stripped of oil by contact with a gaseous stripping medium in a stripping zone, the stripped catalyst regenerated, and the regenerated catalyst returned to the reaction zone for contact with further hydrocarbon vapors to be converted. Operations of the type described are commonly designated fluid catalyst processes.

In our copending applications Ser. No. 745,036, and Ser. No. 745,038, filed concurrently herewith, we have described and claimed improved fluid catalyst processes and apparatus wherein more uniform contact between the catalyst and the gaseous media in the reaction and regenerating zones, respectively, is effected, resulting in more efficient use of the catalyst. The present invention is directed, more particularly, to improvements in the method and apparatus for effecting the stripping of vaporizable hydrocarbons from the catalyst prior to regeneration.

In fluid catalyst processes, the catalyst is usually maintained throughout the system in a fluidized condition. However, the catalyst is normally not of uniform density throughout the various stages of the operation. In the reaction zone, the regenerating zone, and the stripping zone, respectively, there is, maintained a "high density," or "dense phase," body of catalyst of considerable depth, through which the gases and vapors pass and above which the catalyst in relatively low concentration is suspended in the ascending gases, or vapors.

In conventional operation, these dense phase bodies of catalyst are in a continuously turbulent state which causes a mixing of the catalyst resulting in a heterogeneous mass of catalyst in the bed, so that the catalyst withdrawn from the bed for regeneration, or returned to the reaction zone, contains catalyst particles only partially spent, inadequately stripped or only partially regenerated.

According to our said copending applications, this condition is largely avoided by interrupting the relatively dense phase of the beds of catalyst in the respective zones by alternate zones of less catalyst density in which the catalyst in relatively low concentration is entrained in an upwardly rising restricted stream, or streams, of vapors, or gases, of increased velocity and permitting catalyst to gravitate downwardly through annular spaces surrounding the upwardly rising gaseous streams.

In our copending application Ser. No. 745,036, there is described and claimed a process in which the catalyst and gaseous medium are introduced into the lower part of the reaction and regenerating zones, respectively, passed generally concurrently, upwardly therethrough, and removed from the upper portion of the respective chambers.

In our copending application Ser. No. 745,038, we have described and claimed a further improved method of operation according to which the catalyst is introduced into the upper portion of the respective chambers, passed downwardly therethrough countercurrent to the rising gaseous medium and withdrawn from the lower portion of the chamber.

Our present invention is applicable generally to either of these methods, and also to conventional methods, of contacting the catalyst with hydrocarbon vapors or regenerating gases.

In the usual regenerating step of processes of this type, the catalyst to be regenerated is blown with air or other oxidizing gases under such conditions as to result in the burning off of coke, carbon, and any residual hydrocarbon absorbed therein. It is highly desirable to recover from the catalyst, prior to regeneration, as large a proportion as possible of absorbed hydrocarbon because of their substantial commercial value, and also to avoid difficulties due to excessive temperatures in the reaction zone. Accordingly, uniform and thorough stripping of the catalyst prior to regeneration is an essential of most efficient operation.

In accordance with our present invention, we effect thorough and uniform stripping of the vaporizable hydrocarbons from the spent catalyst, by passing the catalyst downwardly through a vertically elongated stripping zone countercurrent to a rising stream of steam, or other stripping gaseous medium, introduced into the lower portion of the chamber. The catalyst enters the stripping zone from the reactor in a relatively dense phase and normally would gravitate downwardly through the stripping zone in an uninterrupted relatively dense phase body. However, in accordance with our improved stripping method, the relatively dense phase body of catalyst passing downwardly through the stripping zone is interrupted by alternate zones of less density in which the catalyst in relatively low concentration is entrained in a coaxially positioned, upwardly rising restricted stream of the stripping medium at increased velocity.

This is, with advantage, accomplished by suspending within the stripping zone in the path of the catalyst a substantially vertically disposed chimney, advantageously cylindrical and coaxially positioned within the stripping zone, the chimney being enlarged at its lower end to a diameter somewhat less than the transverse dimension of the stripping zone so as to form an annular space between the restricting walls of the stripping zone and the outer enlarged diameter of the chimney. The vertically elongated stripping zone is thus divided into a plurality of zones by the annular constrictions.

The upwardly rising stripping medium is caught in the lower enlarged section, or bell, of the chimney and, flows upwardly through the restricted area of the chimney at increased velocity, preventing the downwardly flowing catalyst from entering the upper end of the chimney.

The catalyst passes downwardly around the chimney and through the restricted annular space at the lower end of the chimney where a large proportion of it is caught up by the rising stream of gaseous stripping medium and carried upwardly through the chimney. This operation is repeated as the catalyst passes downwardly through the stripping zone. The catalyst is thus repeatedly resuspended in the stripping medium, resulting in uniform and intimate contact between the catalyst and the stripping medium whereby thorough stripping of vaporizable hydrocarbons from the catalyst is effected.

The present invention provides an improved process adapted to continuous operation and comprising a plurality of cooperating steps so coordinated as to constitute a unitary operation in which a charge of catalyst is repeatedly used, uniformly and thoroughly stripped of absorbed vaporizable hydrocarbons, regenerated and returned to the reaction zone, in which increased catalytic efficiency and decreased losses of hydrocarbons through burning are attained. The invention also provides apparatus especially adapted to the carrying out of our improved stripping operation.

Figure 2:
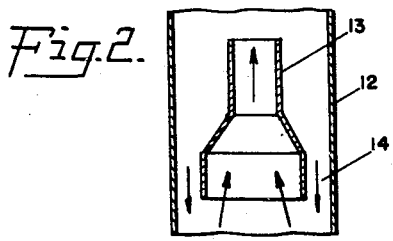

The invention will be more fully described and illustrated with reference to the accompanying drawing, of which Figure 1 represents, conventionally and diagrammatically, a flow diagram of a fluid catalyst cracking process embodying our invention, and Figure 2 is an enlarged fragmentary view of the interior arrangement of the stripper.

Referring more particularly to Figure 1 of the drawing, the apparatus indicated by the reference numeral 1 represents a generally cylindrical reactor which may be of conventional type, but which is, with advantage, of the type shown, described and claimed in our previously noted copending applications, which is provided internally with a plurality of trays 2 extending entirely across the reactor and dividing the lower and intermediary portion of the reactor into a plurality of zones 3. The trays 2 are provided with a plurality of uniformly spaced circular openings and there is suspended in each of the openings, by suitable brackets or the like not shown, a chimney 4, having a cylindrical body portion of somewhat smaller outer diameter than the diameter of the openings in the tray, so as to provide an annular space 5 surrounding the chimney. These chimneys extend through the openings in the trays from a distance well above the tray to somewhat below the tray and are flared outwardly at their lower ends.

The catalyst suspended in vaporized charge oil passes into the lower end of the reactor through conduit 6 and is carried upwardly therethrough by the rising vapors. In passing upwardly through the reactor, there is a tendency for the catalyst to drop out of suspension forming a relatively dense phase body of catalyst on each of the trays which continuously passes downwardly from tray to tray through the annular spaces 5, is re-entrained in the rising stream of vapors and is again carried upwardly through the chimney.

After passing through each of the trays of the reactor, and the beds of catalyst thereon, the vapors pass from the upper portion of the reactor through cyclone separator 7, for removal of suspended catalyst, the latter dropping back into the reactor and the vapors pass out through line 8 to a fractionator, not shown.

In operation, a relatively dense phase fluidized body of catalyst, say, of a density of about 50 to 60 pounds per cubic foot, will be formed on the respective trays for a depth equal to the height of the chimneys above the tray. In the zone of the reactor between the top of a lower chimney and the lower end of the next higher chimney, there will be maintained a body of somewhat lower catalyst density, say, 25 to 35 pounds per cubic foot, due to the upward passage of the vapors therethrough. The concentration of catalyst in the streams of vapor passing upwardly through the chimneys will be still less, say, about 2 to 12 pounds per cubic foot. Thus, the catalyst will be repeatedly redispersed in the vapors in the respective zones of the reactor, affording thorough and uniform contact between the catalyst and the vapors. Though the catalyst is repeatedly circulated in the respective zones, such intermixing as occurs is primarily of catalyst of relatively similar catalyst activity, objectionable top-to-bottom mixing of the catalyst being minimized.

The summation of the depths of the bodies of catalyst between the tops of lower chimneys and the bottoms of the next higher chimneys may, with advantage, be about that of the customary depth of the catalyst bed in conventional operation. However, due to more thorough contact between catalyst and the hydrocarbon vapors, somewhat less depth will generally be found effective to accomplish comparable results.

As previously noted, the catalyst passes downwardly through the annular spaces 5 from a higher dense phase body of catalyst to a lower zone of less density where the descending catalyst is picked up by the rising stream of vapors and carried therewith upwardly through the chimneys into the next higher zone. Accordingly, the effective path of the catalyst through the reactor in intimate contact with the vapors is increased.

Also, the vapors in passing upwardly through the reactor are periodically broken up into a plurality of relatively small streams uniformly spaced throughout the transverse area of the reactor, thus avoiding channelling of vapors through the catalyst bed without adequate contact with the catalyst.

By so coordinating the rates of feed to the reactor and the dimensions of the various elements of the reactor and velocities of flow, as hereinafter more fully described, the dominant flow of the catalyst through the reactor is upwardly, dense phase bodies of spent catalyst forming on the upper trays. Spent catalyst is withdrawn from one or more of the trays of the reactor through line 9, or lines 9, the flow being controlled by valves 10, passes downwardly through line 11 into the upper zone of a vertically elongated cylindrical stripper 12 and passes generally downwardly through the stripper countercurrent to steam, or other stripping medium introduced into the lower end of the stripper. As more clearly shown in Fig. 2 of the drawings, the stripper is provided internally with a plurality of chimneys 13, coaxially positioned within the stripper. These chimneys are, with advantage, somewhat larger than the chimneys of the reactor but are likewise flared at their lower end and are of such maximum diameter as to provide an annular space 14 between the maximum diameter of the chimney and the outer wall of the stripper. Steam and stripped hydrocarbons pass from the upper portion of the stripper through line 15 into the upper portion of the reactor.

In passing downwardly through the stripper, the catalyst forms a relatively dense phase bed surrounding the chimneys, of a height approximating that of the chimneys and of a density substantially that of the bed surrounding the chimneys in the reactor, previously described. Catalyst beds of lower density are formed in the zones extending from the upper end of one chimney to the bottom of the next higher chimneys, corresponding to the beds of catalyst between the chimneys of the reactor and of similar density.

The catalyst passes from the dense phase bodies surrounding the chimneys through the annular spaces 14 and a substantial proportion thereof is caught up by the steam passing upwardly through the chimneys and carried thereby upwardly to the lower density bed above the chimney. The concentration of the catalyst in the stream of vapors rising through the chimney will be within a range similar to that of the vapors passing through the respective chimneys of the reactor previously described.

Spent catalyst is withdrawn from the lower portion of the stripper through conduit 16, the flow being controlled by slide valve 17, flows into conduit 18 and is carried therethrough in fluid suspension upwardly into spent catalyst hopper 19 in which the catalyst is precipitated from the suspension. The conveying gaseous medium passes from the upper portion of the hopper through cyclone type separator 20 and out through conduit 21 to a stack, or otherwise disposed of. Residual catalyst in suspension in the effluent gases from the hopper are returned by the separator 20 to the body of catalyst in the hopper.

From the hopper, the catalyst flows through line 22, the flow being controlled by valve 23 into the upper portion of the regenerator 24, which may be of conventional type but which is, with advantage, of the type illustrated in the drawings.

The regenerator shown is provided with chimney trays of the type described with reference to the reactor, similar parts being identified by like reference numerals.

The catalyst passes generally downwardly through the regenerator countercurrent to an upwardly rising stream of air, or other oxidizing gas, introduced into the lower portion of the regenerator through line 25. Products of combustion, or flue gases, pass from the upper portion of the regenerator through line 26 from which all or a portion of the flue gas is passed through line 27 to blower 28 by which it is forced through line 18 for conveying spent catalyst from the stripper to the spent catalyst hopper, as previously described. Instead of flue gases, other gaseous conveying medium may be used. Any surplus flue gases may be vented to a stack, or precipitator, not shown, through line 29, the flow being controlled by valve 30.

Regenerated catalyst is withdrawn from the lower portion of the regenerator through regenerated catalyst leg 31 and flows into line 6 where it is picked up by the preheated feed oil and returned to the reactor. Passage of the catalyst through leg 31 is controlled by means of valve 32, advantageously a conventional slide valve. The leg 31 is, with advantage, of sufficient length to form an effective seal against the upward passage of vaporized feed oil therethrough to the regenerator.

The chimney arrangement, shown in the stripper, operates satisfactorily where so designed and proportioned with respect to the transverse dimension of the stripper and the amount of stripping medium passed upwardly therethrough that the gaseous medium passes upwardly at a superficial velocity within the range of 0.3 to 1.5 feet per second in the zones between the chimneys, and at a superficial velocity through the chimney within the range of 3.5 to 7 feet per second. By selection of the proper chimney diameters, lengths, and bottom bell diameters with respect to the transverse area of the stripper, it is possible to obtain ratios of chimney area to the transverse area of the stripper within the range of 1:3.5 to 1:15 to obtain the desired velocities above noted.

The chimney height may vary from about $\frac{1}{15}$ to about ½ the diameter of the stripper and the chimneys are suspended within the stripper by spiders, or the like, or by other conventional structure, designed to form minimum obstruction to the downward flow of catalyst.

The distance between chimneys will depend primarily upon the number of zones desired and the total height of the stripper. The catalyst loading of the upflow vapors will vary from 2.5 to 12 pounds of catalyst per cubic foot of gaseous stripping medium and the downflow of catalyst through the annular spaces surrounding the chimneys at their lower ends will be within the range of .25 to 0.5 ton per square foot per minute.

The catalyst employed may be of the type conventionally used in fluid catalyst processes, for instance, a silica-alumina type catalyst in finely divided or powdered form. The reaction conditions may likewise be those conventionally used in operations of this type, and as understood by the art, the optimum temperatures and pressures will depend primarily upon the type of feed stock used, the particular catalyst employed and the reaction desired.

In cracking gas oil, for instance, the reaction temperature may, with advantage, be within the range of 800° to 1,000° F. and the pressure at the top of the reactor within the range of about 5 to 25 pounds per square inch. The regeneration temperature may be within the range of 950° to 1,200° F., heat for the reaction being supplied largely by the hot catalyst passing to the charge oil from the regenerator.

It will be understood that the present invention is not restricted to the particular embodiment thereof herein described but is applicable to various modifications of fluid catalyst processes.

We claim:

1. In the fluid catalyst process for the conversion of hydrocarbons wherein the hydrocarbon to be converted is brought into intimate contact with the catalyst in a reaction chamber, the spent catalyst is withdrawn from the reaction chamber and stripped of absorbed hydrocarbons by passing a gaseous stripping medium upwardly through a dense phase fluidized body of the catalyst in a stripping chamber, the improvement which comprises introducing the spent catalyst from the reaction chamber in relatively dense phase into the upper portion of the stripping chamber and causing the catalyst to gravitate generally downwardly therethrough, introducing a gaseous stripping medium into the lower portion of the stripping chamber and passing it upwardly therethrough through a plurality of alternate zones of low velocity and high velocity, the transverse area of the low velocity zones being substantially that of the stripping chamber and the superficial velocity of the stripping medium in the low velocity zones being within the range of 0.3 to 1.5 feet per second, the high velocity zones being composed, respectively, of a single restricted substantially vertical stream coaxially positioned within the chamber and the superficial velocity of the restricted stream of stripping medium through the high velocity zones being within the range of 3.5 to 7 feet per second, whereby dense phase bodies of catalyst will form in the low velocity zones, permitting the catalyst to gravitate downwardly from the respective dense phase bodies of catalyst to the next lower zone of the stripping chamber in an annular stream surrounding the upwardly flowing high velocity stream of the stripping medium, withdrawing the stripping medium and stripped hydrocarbons from the upper portion of the stripping chamber and withdrawing stripped catalyst from the lower portion of the stripping chamber.

2. Apparatus for stripping absorbed hydrocarbons from spent solid catalyst comprising a vertically elongated cylindrical chamber, a conduit opening into the upper portion of said chamber and adapted to the charging of spent catalyst to the chamber, a second conduit leading from the lower portion of the chamber and adapted to the withdrawal of the catalyst from the chamber, a plurality of vertically disposed chimneys coaxially positioned within the chamber, the chimneys having a cylindrical body portion and being enlarged at their lower ends so as to form a constricted annular space between the enlarged portion of the chimney and the walls of the chamber, the ratio of the transverse area of the chimney body portion to the transverse area of the stripping chamber being within the range of 1:3.5 to 1:15, and a connection for introducing a gaseous stripping medium into the lower portion of the chamber.

RALPH E. HALL.
MARION J. WILCOX.

REFERENCES CITED

The following references are of record in the file of this patent:

UNITED STATES PATENTS

| Number | Name | Date |
|---|---|---|
| 1,380,067 | Koch et al. | May 31, 1921 |

FOREIGN PATENTS

| Number | Country | Date |
|---|---|---|
| 391,800 | Great Britain | May 3, 1933 |